(12) United States Patent
Somervill et al.

(10) Patent No.: US 8,473,663 B2
(45) Date of Patent: Jun. 25, 2013

(54) STACKABLE FORM-FACTOR PERIPHERAL COMPONENT INTERCONNECT DEVICE AND ASSEMBLY

(75) Inventors: Kevin M. Somervill, Newport News, VA (US); Tak-kwong Ng, Yorktown, VA (US); Wilfredo Torres-Pomales, Hampton, VA (US); Mahyar R. Malekpour, Hampton, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 259 days.

(21) Appl. No.: 13/011,198

(22) Filed: Jan. 21, 2011

(65) Prior Publication Data

US 2011/0213910 A1    Sep. 1, 2011

Related U.S. Application Data

(60) Provisional application No. 61/297,366, filed on Jan. 22, 2010.

(51) Int. Cl.
*G06F 3/00* (2006.01)
*G06F 13/00* (2006.01)
*G06F 1/04* (2006.01)
*H05K 7/10* (2006.01)

(52) U.S. Cl.
USPC .............. 710/301; 710/8; 710/14; 710/110; 710/316; 713/500; 713/503

(58) Field of Classification Search
USPC .............. 710/8, 10, 14, 300, 301, 303, 305, 710/316, 110; 713/400, 401, 500, 503
See application file for complete search history.

(56) References Cited

U.S. PATENT DOCUMENTS

2004/0230709 A1* 11/2004 Moll ................................ 710/1
2005/0280742 A1* 12/2005 Jaffe ............................ 348/726

FOREIGN PATENT DOCUMENTS

KR    2005099117 A  * 10/2005

OTHER PUBLICATIONS

"Flash FPGAs in the Value-Based Marker". Actel Corporation. Jan. 2005. pp. 1-9.*

* cited by examiner

*Primary Examiner* — Thomas J Cleary
(74) *Attorney, Agent, or Firm* — Andrea Z. Warmbier

(57) ABSTRACT

A stackable form-factor Peripheral Component Interconnect (PCI) device can be configured as a host controller or a master/target for use on a PCI assembly. PCI device may comprise a multiple-input switch coupled to a PCI bus, a multiplexor coupled to the switch, and a reconfigurable device coupled to one of the switch and multiplexor. The PCI device is configured to support functionality from power-up, and either control function or add-in card function.

14 Claims, 3 Drawing Sheets

STACKABLE FORM-FACTOR PERIPHERAL COMPONENT INTERCONNECT DEVICE AND ASSEMBLY

CROSS REFERENCE TO RELATED APPLICATIONS

This application claims the benefit of priority under 35 U.S.C. §119 of U.S. Provisional Pat. App. Ser. No. 61/297,366, filed Jan. 22, 2010, the contents of which are incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

FIELD OF THE INVENTION

This invention relates to Peripheral Component Interconnect (PCI) hardware configurations. More specifically, the invention is a stackable form-factor PCI device that can be configured as a host controller, a master card, or a target card.

BACKGROUND OF THE INVENTION

PCI assemblies may include a host controller coupled to a PCI bus, and one or more master devices and one or more target devices. The master and target devices may also be coupled to the PCI bus. One type of PCI assembly is a stackable form-factor assembly. A representative stackable form-factor PCI assembly 100 in conformance with a PC/104 or PC/104-Plus specification is illustrated in FIG. 1. Briefly, clock signals 103 from a host controller 102 are length-matched to compensate for the distance from host controller 102 to each master/target: card 104 coupled to a PCI bus 106. That is, host controller 102 adjusts or skews timing of the clock signals 103 depending on how far the clock signal 103 must travel to a particular master/target card 104.

For a PC/104-Plus assembly, each master/target card 104 utilizes 4:1 multiplexor 104A to manage clock signal selection from PCI bus 106. In terms of providing a device clock signal for the particular master/target device 104B, multiplexor 104A selects the appropriate time-skewed clock signal from PCI bus 106 for the device clock 108. Since clock signal adjustments or skewing is unique to host controller 102, the PCI assembly requires a design for a host controller 102 and a different design for a master/target card 104.

In addition, stackable form-factor PCI devices/assemblies may be constructed using SRAM-based Field Programmable Gate Arrays (FPGAs). However, these types of devices require device configuration after power up and before use thereof. This time delay (on the order of several hundred milliseconds) delays the PCI assembly's operational functions.

SUMMARY OF THE INVENTION

Accordingly, it is an object of the present invention to provide a PCI device that is configurable as a host controller, a master card, or a target card in a stackable form-factor PCI assembly.

Another object of the present invention is to provide a stackable form-factor PCI assembly that becomes operationally functional immediately, or substantially immediately, upon power up.

In accordance with the present invention, a stackable form-factor PCI device is provided. The device may include multiple-input switch coupled to a PCI bus, a multiplexor coupled to the switch, and a reconfigurable device coupled to one of the switch and multiplexor. When the reconfigurable device is configured as a PCI host controller that generates clock signals time-skewed in correspondence with known locations on the PCI bus, the reconfigurable device provides the clock signals to the switch where the clock signals are driven onto the PCI bus. When the reconfigurable device is configured as at least one of a PCI master device and a target device, the switch (i) receives the clock signals from the PCI bus at one of the known locations corresponding to the PCI master/target device, and (ii) provides the clock signals so-received to the multiplexor wherein one of the clock signals is selected by the multiplexor for presentation as a device clock to the PCI master/target device.

A stackable form-factor PCI device is also provided comprising a multiple-input switch adapted to be coupled to a PCI bus, a multiplexor coupled to the switch, a reconfigurable device coupled to one of the switch and the multiplexor. The reconfigurable device may be configured as a PCI host controller generating clock signals time-skewed in correspondence with known locations on the PCI bus. The reconfigurable device can provide the clock signals to the switch and the clock signals may be driven onto the PCI bus. The reconfigurable device may be configured as at least one of a PCI master device and a PCI target device. The switch may (i) receive the clock signals from the PCI bus at one of the known locations corresponding to the at least one of a PCI master device and a PCI target device, and (ii) provide the clock signals so-received to the multiplexor, wherein one of the clock signals is selected by the multiplexor for presentation to the at least one of a PCI master device and a PCI target device. The multiplexor and the reconfigurable device may be configured on a Field Programmable Gate Array (FPGA), which may comprise a flash-based FPGA. Alternatively, the switch may comprises a 2:1 switch, and the multiplexor may comprise a 4:1 multiplexor.

A stackable form-factor PCI device is also provided comprising a multiple-input switch adapted to be coupled to a PCI bus, a multiplexor coupled to the switch, a reconfigurable device coupled to one of the switch and the multiplexor. The reconfigurable device may be configured as a PCI host controller generating clock signals time-skewed in correspondence with known locations on the PCI bus. The reconfigurable device can provide the clock signals to the switch and the clock signals may be driven onto the PCI bus. The reconfigurable device may be configured as at least one of a PCI master device and a PCI target device. The switch may (i) receive the clock signals from the PCI bus at one of the known locations corresponding to the at least one of a PCI master device and a PCI target device, and (ii) provide the clock signals so-received to the multiplexor, wherein one of the clock signals is selected by the multiplexor for presentation to the at least one of a PCI master device and a PCI target device. The multiplexor and the reconfigurable device may be configured on a Field Programmable Gate Array (FPGA), which may comprise a flash-based FPGA. Alternatively, the switch may comprises a 2:1 switch, and the multiplexor may comprise a 4:1 multiplexor.

The stackable form-factor PCI device may comprise a PCI bus, a multiple-input 2:1 switch coupled to the PCI bus, a 4:1 multiplexor coupled to the switch and a reconfigurable device coupled to one of the switch and the multiplexor. The reconfigurable device may be configured as a PCI host controller generating clock signals time-skewed in correspondence with known locations on the PCI bus. The reconfigurable device can provide the clock signals to the switch wherein the clock signals are driven onto the PCI bus. The reconfigurable device may be configured as at least one of a PCI master device and a PCI target device. The switch may (i) receive the clock signals from the PCI bus at one of the known locations corresponding to the at least one of a PCI master device and a PCI target device, and (ii) provide the clock signals so-received to the multiplexor wherein one of the clock signals is selected by the multiplexor for presentation to the at least one of a PCI master device and a PCI target device. The switch, multiplexor and reconfigurable device may be configured on a FPGA, which may include a flash-based FPGA.

A stackable PCI assembly is also provided comprising a PCI bus, a plurality of PCI devices coupled to the PCI bus. Each PCI devices may comprise a multiple-input switch coupled to the PCI bus; a multiplexor coupled to the switch; and a reconfigurable device coupled to one of the switch and multiplexor. The reconfigurable device may be configured as a PCI host controller generating clock signals time-skewed in correspondence with known locations on the PCI bus. The reconfigurable device can provide the clock signals to the switch such that the clock signals are driven onto the PCI bus. The reconfigurable device is configured as at least one of a PCI master device and a PCI target device. The switch can (i) receive the clock signals from the PCI bus at one of the known locations corresponding to the at least one of a PCI master device and a PCI target device. and (ii) provide the clock signals so-received to the multiplexor. One of the clock signals may be selected by the multiplexor for presentation to the at least one of a PCI master device and a PCI target device. The PCI devices may be configured on a FPGA, and the FPGA may comprise a flash-based FPGA. The PCI assembly may further include a power on/off control. The FPGA may be programmed with a hardware description language for instant functionality from when the power on/off control powers-on the PCI assembly. The multiplexor can include a 4:1 multiplexor, and the switch can include a 2:1 switch.

DETAILED DESCRIPTION OF THE INVENTION

Figure 1:
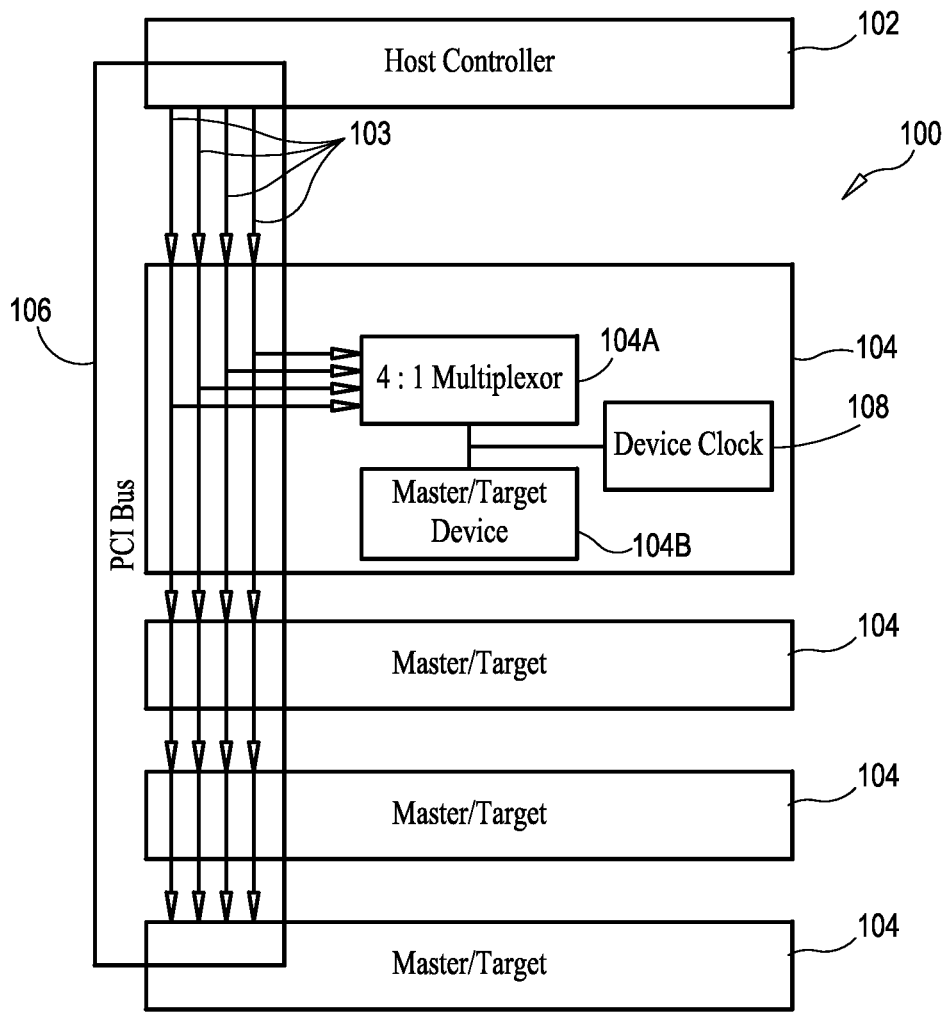
FIG. 1 is a schematic view of a stackable form-factor PCI assembly.
Figure 2:
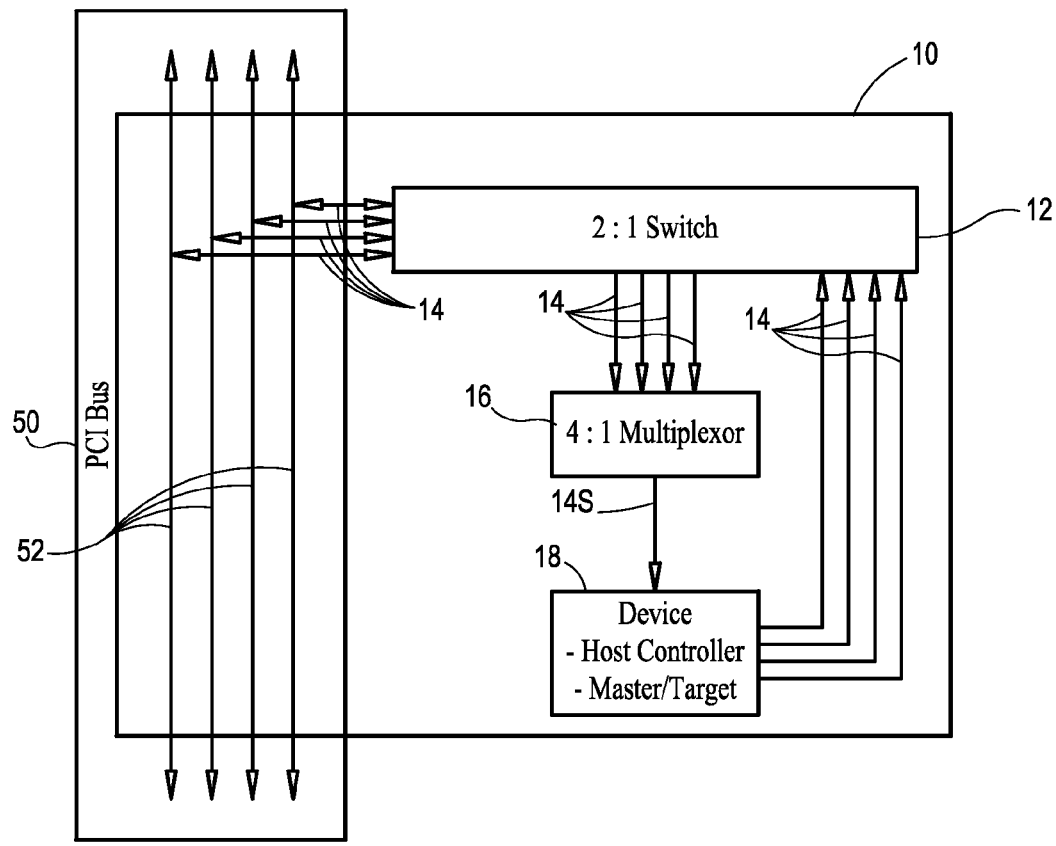
FIG. 2 is a schematic view of a reconfigurable PCI device in accordance with an embodiment of the present invention for use in a stackable form-factor PCI assembly.

Referring now to the drawings and more particularly to FIG. 2, a reconfigurable PCI device 10 in accordance with an embodiment of the present invention is shown. In general, PCI device 10 is configurable as a host controller, a master, and/or a target (also referred to hereinafter as a master/target) for use in a stackable form-factor PCI assembly.

By way of example, PCI device 10 is illustrated in conformance with PC/104-Plus specifications. However, it is to be understood that PCI device 10 could be constructed to conform to other stackable form-factor PCI device/assembly specifications without departing from the scope of the present invention.

PCI device 10 may be coupled to a PCI bus 50. In general, PCI bus 50 provides signal lines 52 capable of carrying clock, data and control signals.

PCI device 10 may be coupled to signal lines 52 of PCI bus 50 through a switch 12. More specifically, switch 12 may comprise a 2:1 switch that either drives clock signals 14 into PCI bus 50 or receives clock signals 14 from PCI bus 50 depending on how PCI device 10 is configured.

Coupled to switch 12 is a multiplexor 16. When PCI device 10 is configured as a master/target in the illustrated example, multiplexor 16 selects one of the multiple clock signals 14 received from switch 12. In one embodiment, the multiplexor 16 comprises a 4:1 multiplexor. Based on its location on PCI bus 50, multiplexor 16 provides a selected one clock signal 14S that will be used by a device 18 configured as a master/target device on a particular PCI assembly. The particular clock signal (line) selected is predicated on the location of PCI device 10 on a PCI assembly.

PCI device 10 can also be configured as a host controller. In this embodiment, device 18 is configured as a host controller that generates clock signals 14 that will be driven onto PCI bus 50 for reception by PCI devices 10 configured as a master/target as described above. Clock signals 14 are length compensated (i.e., time adjusted or skewed) depending on their ultimate destination location on PCI bus 50. For the illustrated example, four different clock signals 14 are output by device 18 to switch 12. The time-skewed clock signals 14 are driven onto PCI bus 50 by switch 12.

Figure 3:
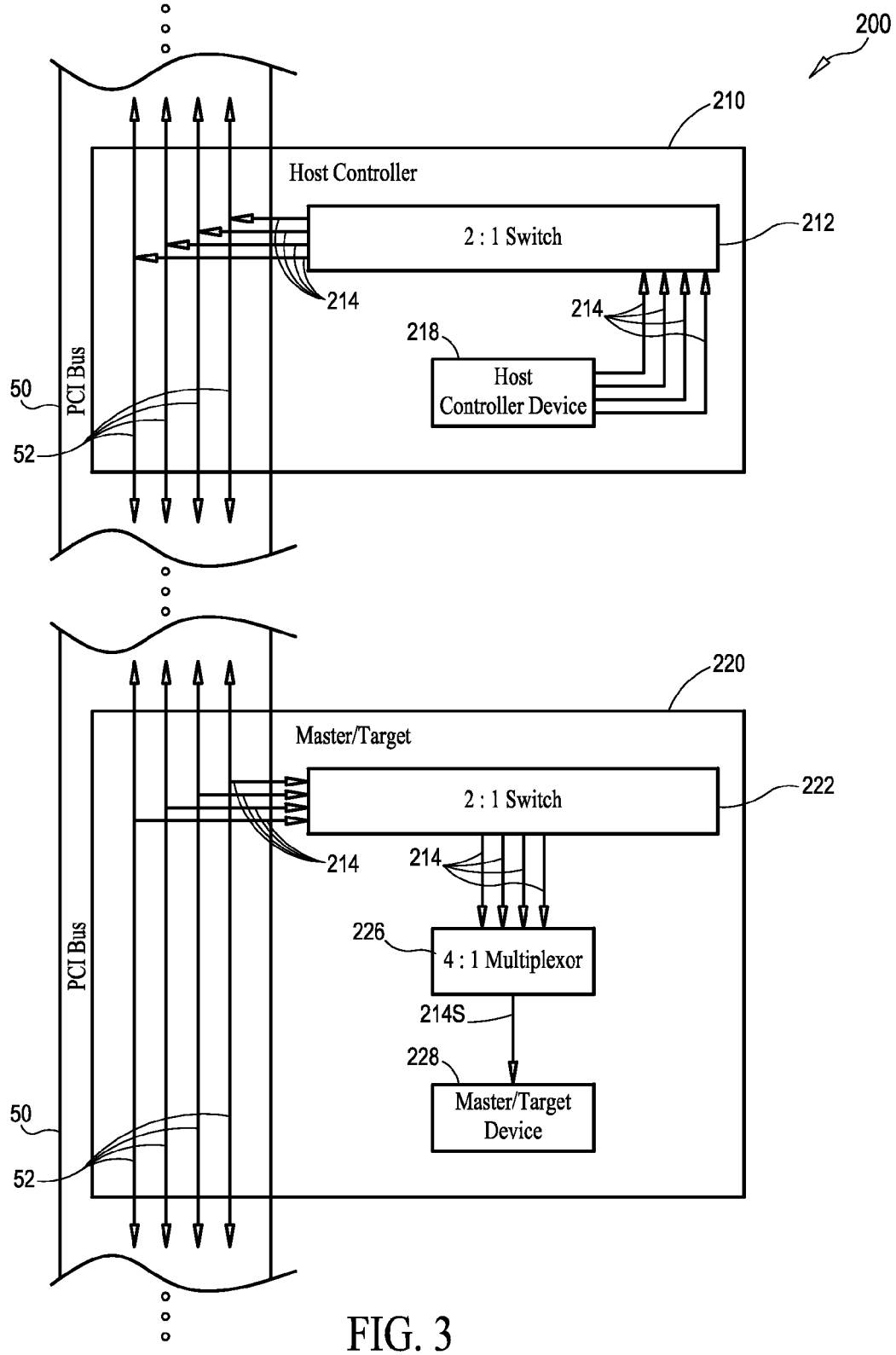
FIG. 3 is a schematic view of a stackable form-factor PCI assembly constructed from reconfigurable PCI devices in accordance with an embodiment of the present invention.

An embodiment of a stacked form-factor PCI assembly 200 based on PCI device 10 is illustrated in FIG. 3 where PCI device 210 is configured as the PCI assembly's host controller and PCI device 220 is configured as a master/target for PCI assembly 200. It is to be understood that additional PCI devices 220 can be (and typically would be) included in PCI assembly 200. PCI device 210 includes a device 218 configured as a host controller that provides switch 212 with time-skewed clock signals 214. Switch 212 drives clock signals 214 onto signal lines 52 of PCI bus 50. Switch 222 of PCI device 220 receives clock signals 214 and passes them to multiplexor 226 which is configured/set to select one clock signal 214S based on the location of PCI device 220 on PCI bus 50. The selected clock signal 214S serves as the device clock for device 228 which can be configured as a master/target of PCI assembly 200.

Each PCI device of the present invention can be constructed or configured on a FPGA. To eliminate time delays normally associated with power-up device configuration, each PCI device of the present invention could be made using a flash-based FPGA. The FPGA may be programmed using hardware description language enabling the instantiation of the PCI interface and the local resource controller.

The advantages of the present invention are numerous. A single hardware design can be configured as a host controller or a master/target for use in a stackable form-factor PCI assembly. Further, by using flash-based FPGAs to make each PCI device, traditional power up time delays are eliminated.

While embodiments and example configurations of the invention have been herein illustrated, shown and described, it is to be appreciated that various changes, rearrangements and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention as defined by the appended claims.

What is claimed as new and desired to be secured by Letters Patent of the United States is:

1. A stackable form-factor Peripheral Component Interconnect (PCI) device, comprising:
    a multiple-input switch adapted to be coupled to a PCI bus;
    a multiplexor coupled to said switch;
    a reconfigurable device coupled to one of said switch and said multiplexor;
    wherein when said reconfigurable device is configured as a PCI host controller generating clock signals time-skewed in correspondence with known locations on the PCI bus, said reconfigurable device provides said clock signals to said switch wherein said clock signals are driven onto the PCI bus; and
    wherein when said reconfigurable device is configured as at least one of a PCI master device and a PCI target device, said switch (i) receives said clock signals from the PCI bus at one of said known locations corresponding to said at least one of a PCI master device and a PCI target device, and (ii) provides said clock signals so-received to said multiplexor wherein one of said clock signals is selected by said multiplexor for presentation to said at least one of a PCI master device and a PCI target device.

2. The stackable form-factor PCI device as in claim 1, wherein said switch, said multiplexor and said reconfigurable device arc configured on a Field Programmable Gate Array (FPGA).

3. The stackable form-factor PCI device as in claim 2, wherein said FPGA comprises a flash-based FPGA.

4. The stackable form-factor PCI device as in claim 1, wherein said switch comprises a 2:1 switch.

5. The stackable form-factor PCI device as in claim 1, wherein said multiplexor comprises a 4:1 multiplexor.

6. A stackable form-factor Peripheral Component Interconnect (PCI) device, comprising:
    a multiple-input 2:1 switch adapted to be coupled to a PCI bus;
    a 4:1 multiplexor coupled to said switch;
    a reconfigurable device coupled to one of said switch and said multiplexor;
    wherein when said reconfigurable device is configured as a PCI host controller generating clock signals time-skewed in correspondence with known locations on the PCI bus, said reconfigurable device provides said clock signals to said switch wherein said clock signals are driven onto the PCI bus; and
    wherein, when said reconfigurable device is configured as at least one of a PCI master device and a PCI target device, said switch (i) receives said clock signals from the PCI bus at one of said known locations corresponding to said at least one of a PCI master device and a PCI target device, and (ii) provides said clock signals so-received to said multiplexor wherein one of said clock signals is selected by said multiplexor for presentation to said at least one of a PCI master device and a PCI target device.

7. The stackable form-factor PCI device as in claim 6, wherein said switch, said multiplexor and said reconfigurable device are configured on a Field Programmable Gate Array (FPGA).

8. The stackable form-factor PCI device as in claim 7, wherein said FPGA comprises a flash-based FPGA.

9. A stackable form-factor Peripheral Component Interconnect (PCI) assembly comprising:
    a PCI bus,
    a plurality of PCI devices coupled to said PCI bus, each of said PCI devices comprising:
        a multiple-input switch coupled to said PCI bus;
        a multiplexor coupled to said switch;
        a reconfigurable device coupled to one of said switch and said multiplexor;
    wherein, when said reconfigurable device is configured as a PCI host controller generating clock signals time-skewed in correspondence with known locations on said PCI bus, said reconfigurable device provides said clock signals to said switch wherein said clock signals are driven onto said PCI bus; and
    wherein, when said reconfigurable device is configured as at least one of a PCI master device and a PCI target device, said switch (i) receives said clock signals from the PCI bus at one of said known locations corresponding to said at least one of a PCI master device and a PCI target device, and (ii) provides said clock signals so-received to said multiplexor wherein one of said clock signals is selected by said multiplexor for presentation to said at least one of a PCI master device and a PCI target device.

10. The stackable form-factor PCI assembly as in claim 9, wherein each of said PCI devices is configured on a Field Programmable Gate Array (FPGA).

11. The stackable form-factor PCI assembly as in claim 10, wherein said FPGA comprises a flash-based FPGA.

12. The stackable form-factor PCI assembly as in claim 11, the PCI assembly further comprising a power on/off control, and wherein said FPGA is programmed with a hardware description language for instant functionality from when said power on/off control powers-on the PCI assembly.

13. The stackable form-factor PCI assembly as in claim 9, wherein said multiplexor comprises a 4:1 multiplexor.

14. The stackable form-factor PCI assembly as in claim 13, wherein said switch comprises a 2:1 switch.

* * * * *